(12) United States Patent
Legrand

(10) Patent No.: US 6,630,226 B1
(45) Date of Patent: Oct. 7, 2003

(54) COMPOSITE CUTTING LINE FOR BRUSH CUTTERS AND EDGE TRIMMERS

(75) Inventor: Emmanuel Legrand, Villeneuve (FR)

(73) Assignee: Speed France, Villefranche sur Saone (FR)

( * ) Notice: Subject to any disclaimer, the term of this patent is extended or adjusted under 35 U.S.C. 154(b) by 654 days.

(21) Appl. No.: 09/037,584

(22) Filed: Mar. 10, 1998

(30) Foreign Application Priority Data

Mar. 14, 1997 (FR) .............................................. 97 03371

(51) Int. Cl.⁷ ................................................. B32B 5/14
(52) U.S. Cl. ........................ 428/143; 428/148; 428/149; 428/150; 428/372; 428/375; 428/379; 428/384; 428/395; 30/347; 30/276; 56/12.7
(58) Field of Search ................................ 428/143, 148, 428/149, 150, 372, 375, 379, 384, 395; 30/347, 276; 56/12.7

(56) References Cited

U.S. PATENT DOCUMENTS

| | | | |
|---|---|---|---|
| 4,054,993 A | | 10/1977 | Kamp et al. .................. 30/276 |
| 4,186,239 A | * | 1/1980 | Mize et al. .................. 428/399 |
| 4,571,831 A | * | 2/1986 | White, III .................... 30/276 |
| 5,288,554 A | * | 2/1994 | Susa et al. ................... 428/364 |
| 5,313,770 A | | 5/1994 | Smothers .................... 56/12.7 |
| 5,432,000 A | * | 7/1995 | Young, Sr. et al. .......... 428/372 |
| 5,463,815 A | * | 11/1995 | Fogle ......................... 30/276 |
| 5,491,025 A | * | 2/1996 | Pihl et al. ................... 428/373 |
| 5,524,350 A | * | 6/1996 | Boland ........................ 30/347 |
| 5,709,942 A | * | 1/1998 | Leydon et al. ............... 30/347 |
| 5,761,816 A | * | 6/1998 | Morabit et al. .............. 30/276 |
| 5,814,176 A | * | 9/1998 | Proulx ........................ 156/167 |

FOREIGN PATENT DOCUMENTS

| | | |
|---|---|---|
| DE | 40 05 879 C | 3/1991 |
| JP | 63 059 812 A | 3/1988 |
| JP | 04 091715 | 3/1992 |
| JP | 04 207110 | 7/1992 |
| JP | 06 205 607 | 7/1994 |
| JP | 06 030627 | 8/1994 |
| WO | 97/195584 | 11/1996 |

* cited by examiner

Primary Examiner—William P. Watkins, III
(74) Attorney, Agent, or Firm—Herbert Dubno

(57) ABSTRACT

A cutting line intended to trim and cut vegetation which can be used in rotary-head implements such as brush cutters and edge trimmers. The cutting line consists of a core of the monofilament type, which is coated with a granular coating, especially in the form of inorganic particles. The line thus has an uneven and/or rough surface appearance. The composite cutting line of this kind has a lower operating noise, a better cutting effect, and eliminates the problems of sticking and breaking at the eyelet in the rotary head.

5 Claims, 2 Drawing Sheets

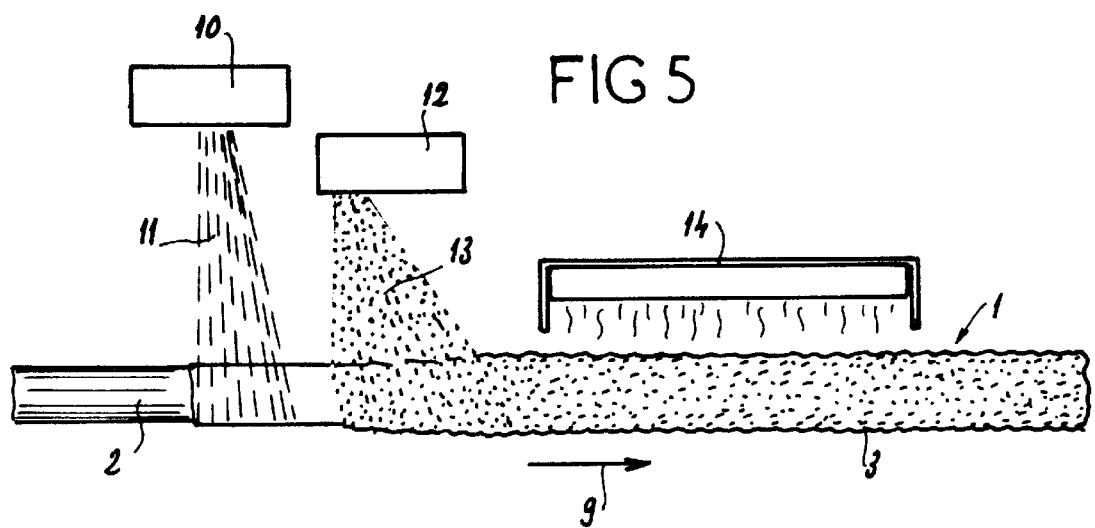

COMPOSITE CUTTING LINE FOR BRUSH CUTTERS AND EDGE TRIMMERS

BACKGROUND OF THE INVENTION

The present invention relates to cutting lines intended for trimming and cutting vegetation, which can be used in motorized rotary-head cultivation implements commonly known as brush cutters and edge trimmers.

DESCRIPTION OF THE PRIOR ART

These implements are generally fitted with a combustion engine or electric motor which rotates, at a high speed which may be between about 3000 revolutions per minute and 12,000 revolutions per minute, a cutting head which carries one or more cutting lines. As the head rotates, and under the effect of centrifugal force, the cutting line or lines splay out radially and thus sweep a certain circular area, within which they have a cutting effect on the vegetation they encounter.

Cutting lines currently manufactured and marketed, intended for such a use, are smooth monofilaments, usually of the "one-material" type, which therefore have the qualities and weaknesses of the raw material used to make them.

The raw material most often used to make cutting lines are synthetic substances, and more particularly polyamide 6, copolyamide 6/66 and copolyamide 6/12. These substances can be very slightly modified or filled to improve their basic characteristics. These substances are always extruded in the form of monofilaments which can have varying diameters and cross sections, in particular a round cross section, but also polygonal or star-shaped profiles. In all instances, and even if they have edges, these monofilaments maintain a smooth surface appearance, that is to say one without roughness.

The cutting lines currently manufactured are therefore good compromises, but their characteristics and performance are still limited by the raw materials used and by the way in which they are manufactured by extrusion, which inevitably leads to a smooth and uniform surface appearance.

The defects and inadequacies of such cutting lines are, in particular, as follows:

While they are being used, these smooth cutting lines generate a great deal of turbulence in the air, and this causes a great deal of unpleasant noise heard as a strong whistling which adds to the noise of the engine or motor driving the rotary head. These noises cause sound pollution which is all the more troublesome since, by their very nature, brush cutters and edge trimmers are used out of doors. Moreover, legislatory stipulations aimed at limiting the noise of these implements to an acceptable level are being written.

The cutting effect of the current cutting lines is due only to the shock induced on the vegetation by their rotation at high speed. This effect may be inadequate, depending on the type of vegetation encountered.

Another drawback is the phenomenon of sticking. Some powerful implements considerably stress the cutting line inside their rotary head, on account of the vibrations and tension in the line due to the rotation of said head at a very high speed, which may be as much as 12,000 revolutions per minute. This causes a significant rise in temperature to very close to the melting point of conventional smooth cutting lines (from 200 to 222° C.), and this rise in temperature may go so far as to cause the turns of line wound on the reel housed in the rotary head to stick.

Another phenomenon observed is "breaking off at the eyelet": an overly stressed conventional smooth cutting line will end up breaking off at the eyelet via which the line emerges from the rotary head. What happens is that following repeated flexural mechanical loadings, the line heats up where it emerges from the eyelet in the head. The progressive rise in temperature of the line causes it to become greatly distended at this point which rapidly becomes a point of weakness, causing the start of a crack in the line; the smooth line then breaks.

Finally, conventional cutting lines made of polyamide are practically nonbiodegradable after use, and the amount of fragmented or worn away cutting line strewn across the entire earth each year is estimated at 10,000 tonnes. A certain amount of European environmental protection arrangements are aimed at limiting the pollution caused from the breakage, wearing away or fragmentation of synthetic monofilaments during their use, but current filaments are not yet able to meet these legislatory requirements.

OBJECT OF THE INVENTION

The object of the present invention is to eliminate all of the drawbacks explained earlier, by providing an improved cutting line which, in particular, gives reduction in noise disturbance and an improved cutting effect, and eliminates the problems of sticking and breaking off at the eyelet, while favoring degradability.

SUMMARY OF THE INVENTION

To this end, the invention provides a cutting line for brush cutters and edge trimmers, the essential feature of which is that it consists of a core of the monofilament type which is coated with a granular coating giving the cutting line an uneven and/or rough surface appearance.

Thus, the invention proposes a cutting line which can be described as a "composite filament", combining a core and a coating, itself composed of one or more ingredients.

The core of this cutting filament can be made, in particular, of an extruded and then drawn synthetic substance, such as polyamide, in the same way as conventional monofilaments which have long proved themselves in this field. This core gives the cutting line the desired characteristics of flexibility and tenacity, which result from its chemical composition, its dimensions and its method of manufacture. The core may have various pro-files; this core may thus have a round cross section, which is the simplest shape, but it may also have a star-shaped or jagged profile, which has the advantage of increasing the area onto which the granular coating can be stuck, and of improving the sticking of this coating to the core. The same results are also obtained, in an alternative form, by providing shapings, such as markings, which are repeated in the direction of the length of the cutting line, on the core.

As regards the granular coating fixed to the core and covering it entirely, this may consist of inorganic, plant-matter, metal or synthetic particles, in each instance giving the final product an uneven and/or rough surface appearance. Inorganic particles, such as particles of silica, glass, fine sand, emery, marble, etc. are more particularly advantageous, in order to increase the abrasive power of the cutting line, and its thermal qualities. The nature and particle size of the particles forming the coating allow the weaknesses of conventional smooth cutting lines to be overcome, in various aspects:

First of all, the surface roughness of the cutting line gives better fluidity of rotation of the line in the air, the roughness on the line breaking up significant turbulence created by a conventional smooth cutting line. The result of this is, on the one hand, a steep drop in the amount of sound generated by the rotation of the line through the air; thus trials carried out by the applicant have recorded, for equal line diameter and equal speed, noise reductions of 8 to 12 decibels depending on the particle size of the coating and, therefore, on the amount of unevenness at the surface of the line. Eliminating the turbulence also, on the other hand, yields a not insignificant reduction in the power needed to keep the line rotating at a given speed; trials carried out by the applicant have thus allowed a saving of 3 to 7% to be measured, for equal line diameters, on the energy consumption needed to keep the cutting line rotating.

Thanks to the roughness of its coating, the cutting line which is the subject of the present invention also creates, as it is used, a "saw" effect which adds to the cutting effect due to the shock produced by the high-speed rotation of this line, and the combination of this abrasive effect with the shock effect significantly improves the cutting capability of the line. The abrasive power of the cutting line is increased to a greater or lesser extent depending on the nature and particle size of the coating. Inorganic particles such as particles of silica, glass, sand, emery, marble, etc. are particularly advantageous in this respect but attractive results can also be obtained with metal particles such as particles of zinc, of iron, of aluminum, especially in the form of powdered oxides of an appropriate particle size. It is also possible to use, from which to make the coating, particles of synthetic substances chosen from those which have excellent abrasion behavior, such as powdered polyamide 11 and elastomers. The use of a coating made of a synthetic substance also seems advantageous in reducing the noise and increasing the life of the cutting line, the elasticity of such a coating offering a first wearing layer before the core of the filament is attacked. A combination of two or more of the previously-mentioned substances, in the form of particles, may be envisaged.

The nature of the coating, and the granular surface appearance of the cutting line according to the invention also allow the problem of the turns sticking inside the rotary head to be eliminated entirely. In particular, certain particles such as particles of silica or glass are recommended for this because the temperatures reached inside the head, although high, can get nowhere near the point at which these particles stick or melt. Furthermore, the granular surface appearance considerably increases the area for heat exchange and therefore encourages cooling of the cutting line. A combination of these two effects allows the phenomenon of sticking in the rotating head to be eliminated entirely.

The granular surface appearance of the cutting line according to the invention also considerably increases the area for heat exchange where the line emerges from the rotary head, and this also results in an appreciable reduction, or even complete elimination of the phenomenon of breaking off at the eyelet.

Finally, for a cutting line of given diameter and given mass, the design that is the subject of the invention makes it possible to reduce the amount of polyamide, limiting it to just the core of the filament, which core may be of a small diameter, and to choose for the coating natural materials or materials which are in themselves readily degradable or alternatively materials whose presence may accelerate the degradation of the "core+coating" assembly by restricting the chemical stability of this complex. Thus, the composite cutting line that is the subject of the invention plays a part in protecting the environment.

Furthermore, it will be noted that such a cutting line can be obtained industrially in a rational and economical way, it being possible for the granular coating to be applied around the core by a coextrusion, coating or dipping process employed continuously. In particular, the method of obtaining the cutting line may consist in coating a continuously-traveling core filament with an adhesive agent, then dusting it with the particles intended to form the granular coating, then finally baking it to fix this coating definitively to the core filament.

BRIEF DESCRIPTION OF THE DRAWINGS

In any case, the invention will be better understood with the aid of the description which follows, with reference to the appended diagrammatic drawing which, by way of examples, depicts a number of embodiments of this composite cutting line for brush cutters and edge trimmers:

FIG. 5 is a diagram of a method and of the corresponding plant for manufacturing a composite cutting line according to the invention.

SPECIFIC DESCRIPTION

Figure 1:
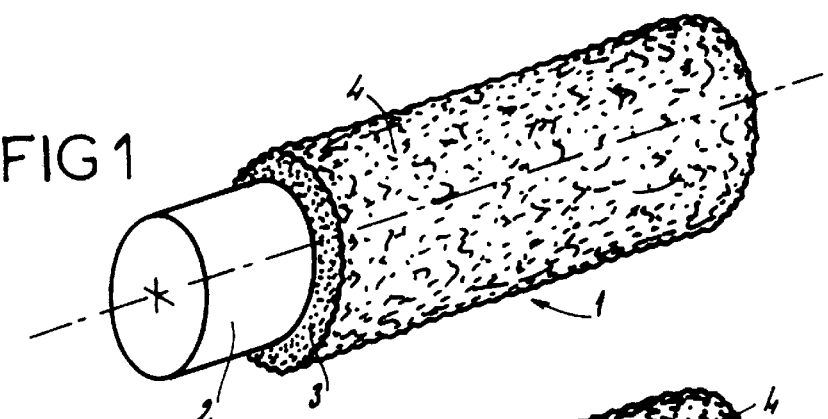
FIG. 1 is a perspective view of a length of cutting line in accordance with the present invention.

FIG. 1 shows a short length of cutting line 1 for brush cutters or edge trimmers, revealing the cross section of this line. The cutting line 1 is made up of a core filament 2, here of round cross section, which is coated all over with a granular coating 3, of annular overall cross section, giving this line 1 an uneven and/or rough external surface 4. The core filament 2 is, for example, a polyamide filament similar to a conventional monofilament. The granular coating 3 which forms the "skin" of the cutting line 1 may be made up of inorganic, plant-matter, metal or synthetic particles; use is made in particular of inorganic particles of silica, glass or sand.

Figure 2:
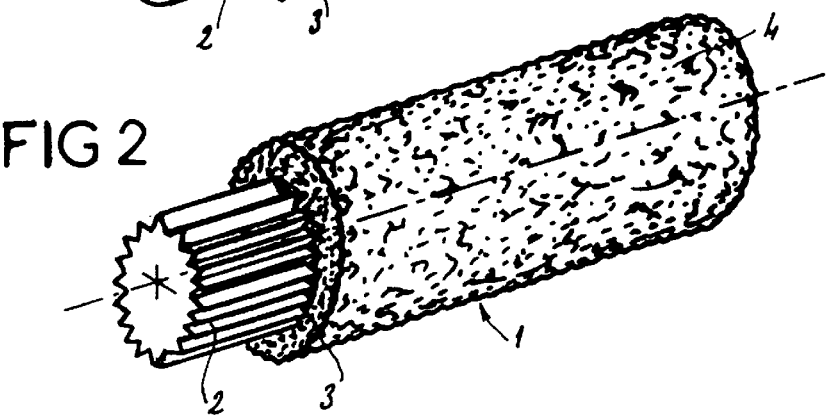
FIG. 2 is a perspective view of another length of cutting line, constituting an alternative version of the previous one.

FIG. 2 also shows a short length of cutting line 1, constituting an alternative version of the previous one. The core filament 2 here has a star-shaped or jagged cross section which increases the area on which the granular coating 3 can be stuck.

Figure 3:
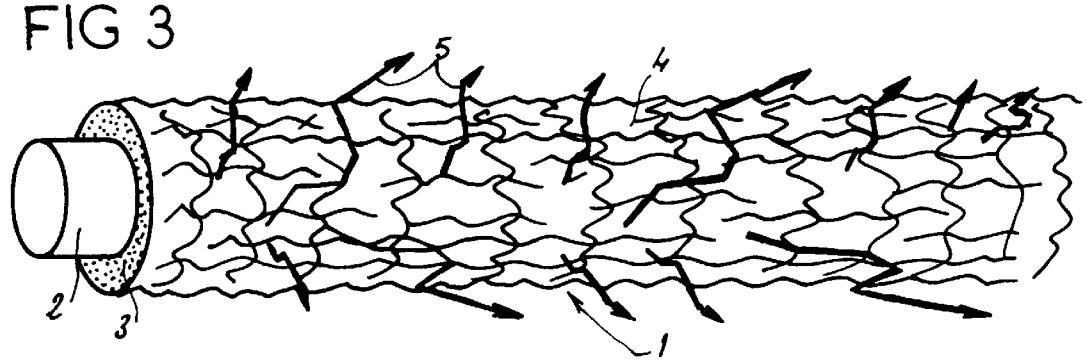
FIG. 3 is a diagram illustrating the breakdown of turbulence in the air which is obtained using the cutting line which is the subject of the invention.
Figure 4:
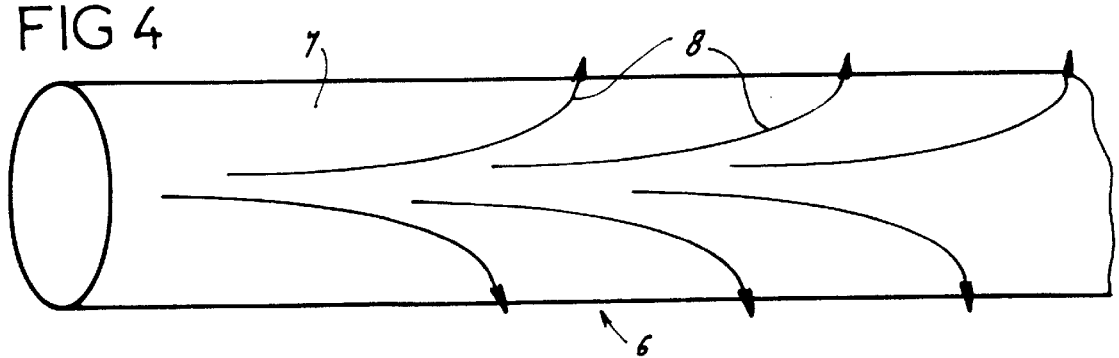
FIG. 4 is another diagram illustrating, for comparison, the turbulence created by a conventional cutting line.

During use of such a cutting line 1, the latter is rotated at high speed, creating turbulence in the surrounding air. The granular coating 3 forming the uneven and/or rough surface 4 breaks up this turbulence, as indicated by the arrows 5 in FIG. 3. This results in particular in a reduction in noise, by comparison with a conventional cutting line 6, as shown in FIG. 4, which has a smooth exterior surface 7 creating substantial amounts of turbulence in the air, as suggested by the arrows 8.

FIG. 5 illustrates the obtaining of the cutting line 1 described earlier, according to a special method. The core filament 2 manufactured beforehand especially by extrusion, travels continuously in the direction of the arrow 9. A spraying or appropriate application device 10 coats the core filament 2 with adhesive 11. Next, a dusting device 12 sprays over the core filament 2 the particles 13 which are intended to form the granular coating, these particles then being held on the core filament 2 thanks to the adhesive coating produced earlier. The assembly finally passes through a baking station 14 which definitively fixes the coating 3, formed of the particles 13, on the core filament 2 so as to obtain, at the exit, the composite cutting line 1. This line 1 can finally be wound onto a receiving reel, not depicted.

As goes without saying, the invention is not restricted merely to the embodiments of this composite cutting line for brush cutters and edge trimmers which have been described hereinabove by way of example; on the contrary, it encompasses all alternative forms thereof which follow the same principle. In particular, it would not be departing from the scope of the invention if the material of the core filament or its cross section were to be modified, or if particles of some other nature and of varying particle sizes were to be used to form the coating, or alternatively if this coating were to be applied and fixed to the core filament using methods other than the one described.

I claim:

1. A cutting line for a rotary head brush cutter and edge trimmer which comprises:

a polyamide monofilament core;

a layer of adhesive on and bonded all over to said core; and a granular coating secured to said core by said layer and entirely covering an outer surface of said core, said coating being composed of particles selected from the group which consists of: silica, glass sand, emery, marble, zinc oxide, ion oxide, aluminum oxide, zinc, iron, aluminum, powdered polyamide 11 and elastomers imparting a rough and uneven texture to said surface.

2. The composite cutting line defined in claim 1 wherein said core has a round cross section.

3. The composite cutting line defined in claim 1 wherein said core has a jagged cross section.

4. The composite cutting line as defined in claim 1 wherein markings capable of increasing an area onto which the granular coating is stuck are repeated in the direction of a length of the cutting line and are provided on said core.

5. The composite cutting line defined in claim 1 which is obtained by coating a continuously traveling core filament with an adhesive agent and then dusting it with said particles and finally baking the cutting line to fix the coating on the core filament.

* * * * *